US012807244B2

(12) United States Patent
Kim et al.

(10) Patent No.: US 12,807,244 B2
(45) Date of Patent: Nov. 24, 2026

(54) VEHICULAR AERODYNAMIC PERFORMANCE IMPROVEMENT APPARATUS

(71) Applicant: HYUNDAI MOBIS CO., LTD., Seoul (KR)

(72) Inventors: Do Hyung Kim, Yongin-si (KR); Soon Mo Lee, Yongin-si (KR); Chan Ho Joo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 281 days.

(21) Appl. No.: 18/626,544

(22) Filed: Apr. 4, 2024

(65) Prior Publication Data

US 2025/0058837 A1 Feb. 20, 2025

(30) Foreign Application Priority Data

Aug. 16, 2023 (KR) ........................ 10-2023-0106898

(51) Int. Cl.

| | |
|---|---|
| ***B62D 35/00*** | (2006.01) |
| ***B60Q 1/26*** | (2006.01) |

(52) U.S. Cl.

CPC ......... *B62D 35/007* (2013.01); *B60Q 1/2661* (2013.01)

(58) Field of Classification Search

CPC .... B62D 35/007; B62D 37/02; B60Q 1/2661; B60Q 1/2611; B60Q 1/2692; B60Q 1/302; B60Q 1/0035; B60Q 1/0088; Y02T 10/82

USPC ........................................................ 296/180.1

See application file for complete search history.

(56) References Cited

U.S. PATENT DOCUMENTS

2023/0069045 A1* 3/2023 Rose .................... B62D 35/007

FOREIGN PATENT DOCUMENTS

| | | |
|---|---|---|
| DE | 3512378 | * 10/1993 |
| DE | 202017100901 | * 3/2017 |
| KR | 10-2023-0035848 A | 3/2023 |

* cited by examiner

*Primary Examiner* — Muhammad Shafi

(74) *Attorney, Agent, or Firm* — NSIP Law

(57) ABSTRACT

A vehicular aerodynamic performance improvement apparatus is provided. The apparatus includes an air current regulator to extend out of and retract into a rear section of a vehicle, and regulate air current that flows along a roof of the vehicle toward an opposite direction from a forward traveling direction of the vehicle, a lamp provided on the air current regulator, and a driver to generate a drive force to operate the air current regulator.

12 Claims, 6 Drawing Sheets

VEHICULAR AERODYNAMIC PERFORMANCE IMPROVEMENT APPARATUS

CROSS-REFERENCE TO RELATED APPLICATION

This application claims priority from and the benefit under 35 USC § 119 of Korean Patent Application No. 10-2023-0106898, filed on Aug. 16, 2023, in the Korean Intellectual Property Office, the entire disclosure of which is hereby incorporated by reference for all purposes.

BACKGROUND

1. Field

Exemplary embodiments relate to a vehicular aerodynamic performance improvement apparatus, and more particularly, to a vehicular aerodynamic performance improvement apparatus being capable of dissipating a vortex, improving aerodynamic performance, and providing visual information to a driver, a nearby vehicle, and a pedestrian.

2. Description of the Related Art

Typically, a vehicle experiences increased aerodynamic resistance caused by a vortex phenomenon of air current that flows along a roof thereof toward the opposite direction to the vehicle's forward traveling direction, and by drag force occurring behind the vehicle while the vehicle travels at a high speed. This increased aerodynamic resistance leads to the problem of decreasing fuel efficiency (energy efficiency).

In order to address this problem, aerodynamic performance improvement apparatuses, such as an air spoiler, an air skirt, and a rear bumper spoiler, for regulating air current are mounted to the vehicle in the related art. However, these aerodynamic performance improvement apparatuses are always exposed to the outside or are only controlled according to the traveling speed of the vehicle, without taking into consideration a neighboring obstacle and a weather change.

Accordingly, the aerodynamic performance improvement apparatus may collide with the obstacle, causing damage thereto. When a strong wind blows, the aerodynamic performance improvement apparatus is in the way of air current, thereby causing the problem of decreasing the traveling stability of the vehicle. Therefore, there is a need to address these problems.

The related art of the present disclosure is disclosed in Korean Patent Application Publication No. 10-2023-0035848 (published on Mar. 14, 2023 and entitled "Communication Spoiler System of Vehicle and System Control Method Thereof").

SUMMARY

Various embodiments of the present disclosure, which are contrived to address the above-mentioned problems, are directed to a vehicular aerodynamic performance improvement apparatus being capable of dissipating a vortex occurring behind an electric vehicle, improving aerodynamic performance of the electric vehicle, and providing visual information to a driver of the electric vehicle, a nearby vehicle, and a pedestrian.

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect of the disclosure, a vehicular aerodynamic performance improvement apparatus includes: an air current regulator configured to: extend out of and retract into a rear section of a vehicle; and regulate air current that flows along a roof of the vehicle in an opposite direction, which is a direction opposite to a forward traveling direction of the vehicle; a lamp provided on the air current regulator; and a driver configured to generate a drive force to operate the air current regulator.

The air current regulator may include a first air current regulator including a pair of fin portions arranged on both sides, respectively, of the rear section, and a second air current regulator including a plurality of vane portions positioned between the pair of fin portions, the plurality of bane portions arranged to be spaced apart from each other along a widthwise direction of the vehicle.

The rear section may include a first rear body having a first accommodation portion in which the pair of fin portions are accommodated, and a second rear body a having a second accommodation portion in which the plurality of vane portions are accommodated.

The driver may include a first actuator connected to the pair of fin portions and configured to rotate the pair of fin portions such that the pair of fin portions accommodated in the first accommodation portion protrudes upward from the first rear body, and a second actuator connected to the plurality of vane portions and configured to rotate the plurality of vane portions such that the plurality of vane portions accommodated in the second accommodation portion protrudes upward from the second rear body.

The lamp may include a first lamp provided on an outer surface of the fin portion and configured to emit light, and a second lamp provided on an end portion of the vane portion and configured to emit light toward the opposite direction to the forward traveling direction of the vehicle.

The vehicular aerodynamic performance improvement apparatus may further include a controller electrically connected to the driver and electrically connected to the lamp, wherein the controller may be configured to receive an operative signal from a vehicular electric component and control an operation of the driver and an operation of the lamp.

The controller may be further configured to control the driver according to a traveling speed of the vehicle such that the air current regulator is exposed or not exposed in the rear section.

The controller may be further configured to control the driver according to a traveling mode of the vehicle such that the air current regulator is exposed or not exposed in the rear section.

In another general aspect of the disclosure, an aerodynamic performance improvement apparatus for a vehicle includes: an air current regulator positioned in at least one of a roof of the vehicle, a section of the vehicle between the roof of the vehicle and a rear of the vehicle, or a combination thereof, the air current regulator including one or more extensions; a driver to actuate the air current regulator; and a processor configured to: control the driver to generate a driving force to operate the air current regulator to fully or partially move the one or more extensions to extend out of the air current regulator or move the one or more extensions to retract into the air current regulator based on a traveling speed of the vehicle; and regulate air current that flows along a roof of the vehicle toward an opposite direction from a forward traveling direction of the vehicle.

The air current regulator may further include at least one of a first air current regulator at the roof of the vehicle, and a second air current regulation regulator at the section of the vehicle between the roof of the vehicle and the rear of the vehicle.

The extensions in the first air current regulator may include a pair of fin portions, and the extensions in the second air current regulator may include a plurality of wing-shaped vane portions.

The wing-shaped vane portions may be positioned between the pair of fin portions, and the wing-shaped vane portions may be smaller in size than the fin portions.

DETAILED DESCRIPTION

Figure 1:
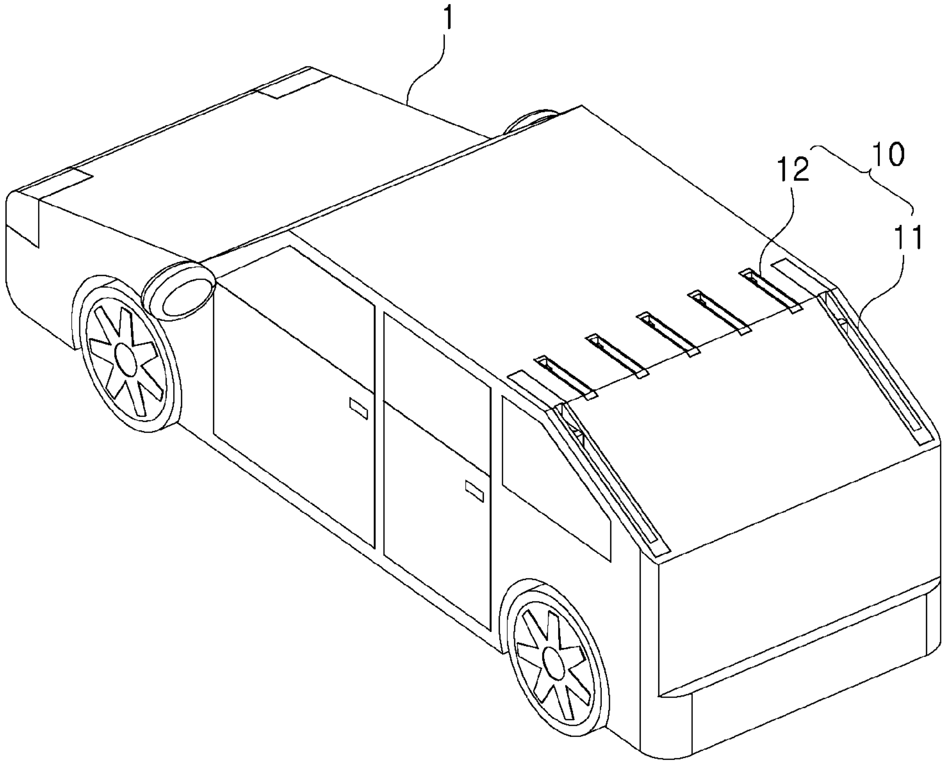
FIG. 1 is a perspective view illustrating a state where an air current regulation unit of a vehicular aerodynamic performance improvement apparatus according to an embodiment of the present disclosure is not exposed in a rear section.

A vehicular aerodynamic performance improvement apparatus according to an embodiment of the present disclosure will be described below with reference to the accompanying drawings. For clarity and convenience in description, thicknesses of lines, sizes of constituent elements, and the like may be illustrated in a non-exact proportion in the drawings. In addition, terms that hereinafter refer to constituent elements, respectively, according to the present disclosure are defined by considering their respective functions and may vary according to a user's or manager's intention or to practices in the art. Therefore, these terms should be contextually defined in light of the present specification.

Figure 2:
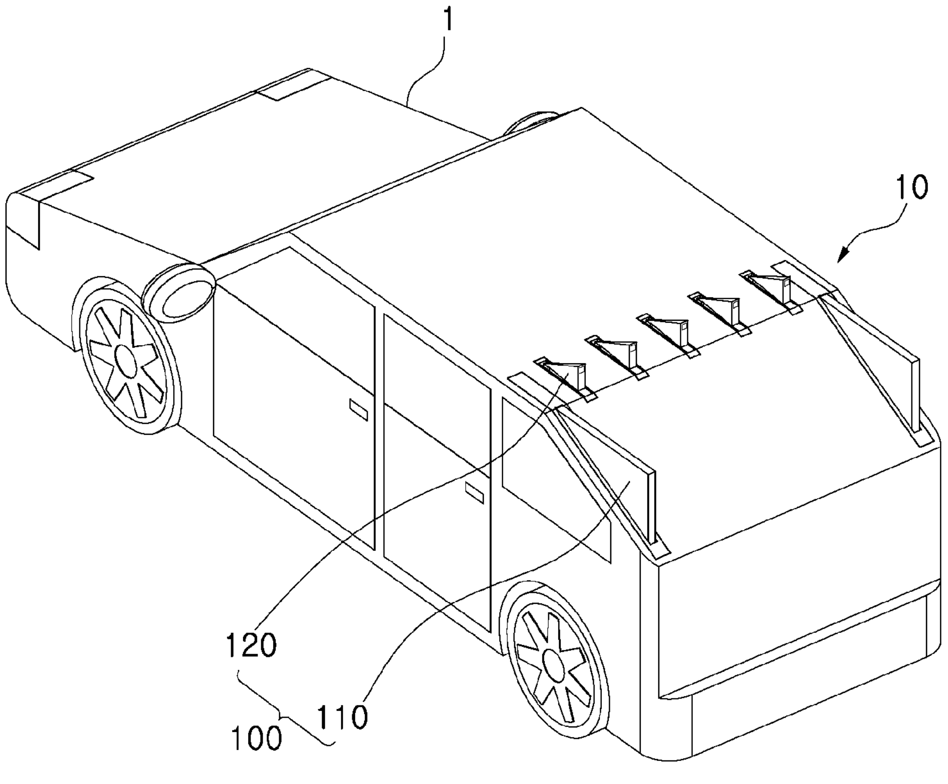
FIG. 2 is a perspective view illustrating a state where the air current regulation unit of the vehicular aerodynamic performance improvement apparatus according to the embodiment of the present disclosure is exposed in the rear section.
Figure 3:
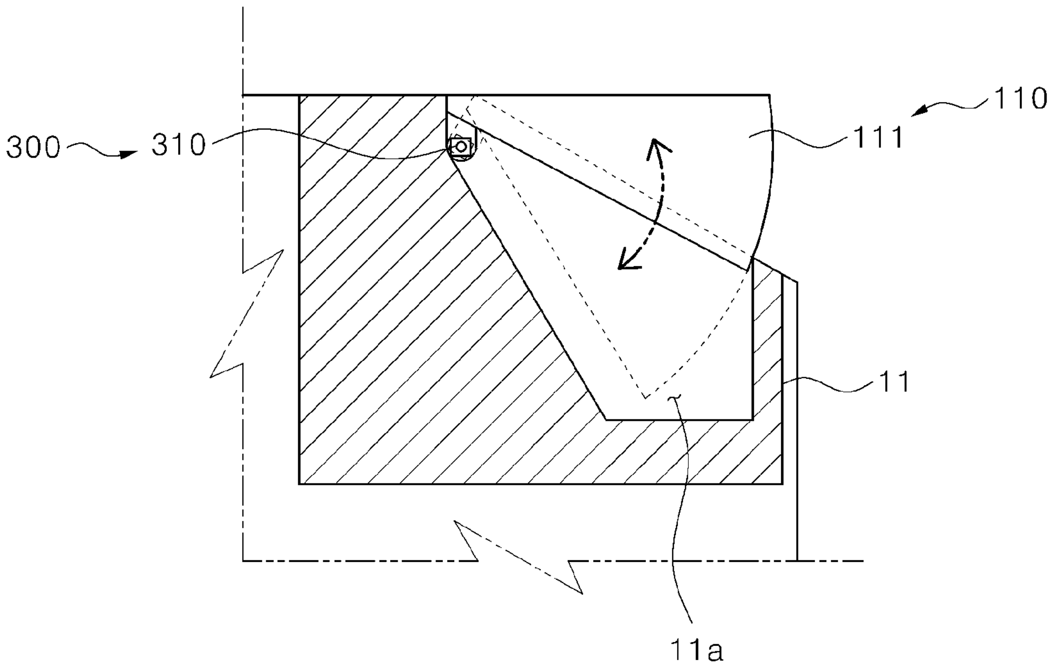
FIG. 3 is a cross-sectional view of a first rear body, which illustrates a state where a first air current regulation unit of the vehicular aerodynamic performance improvement apparatus according to the embodiment of the present disclosure operates.
Figure 4:
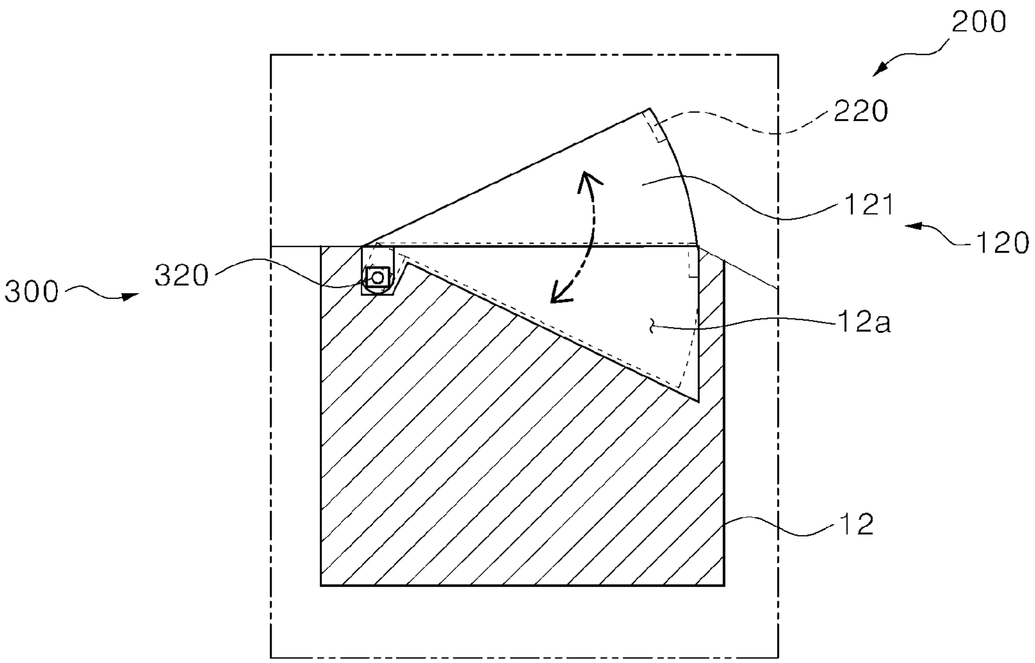
FIG. 4 is a cross-sectional view of a second rear body, which illustrates a state where a second air current regulation unit of the vehicular aerodynamic performance improvement apparatus according to the embodiment of the present disclosure operates.
Figure 5A:
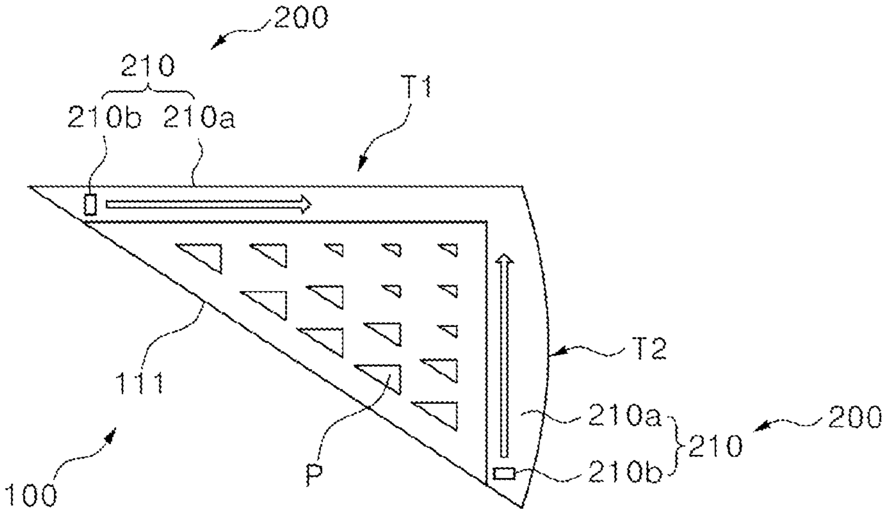
FIGS. 5A, 5B, and 5C are views of one side of a fin portion, which illustrates a state where a first lamp unit of the vehicular aerodynamic performance improvement apparatus according to the embodiment of the present disclosure operates.
Figure 5B:
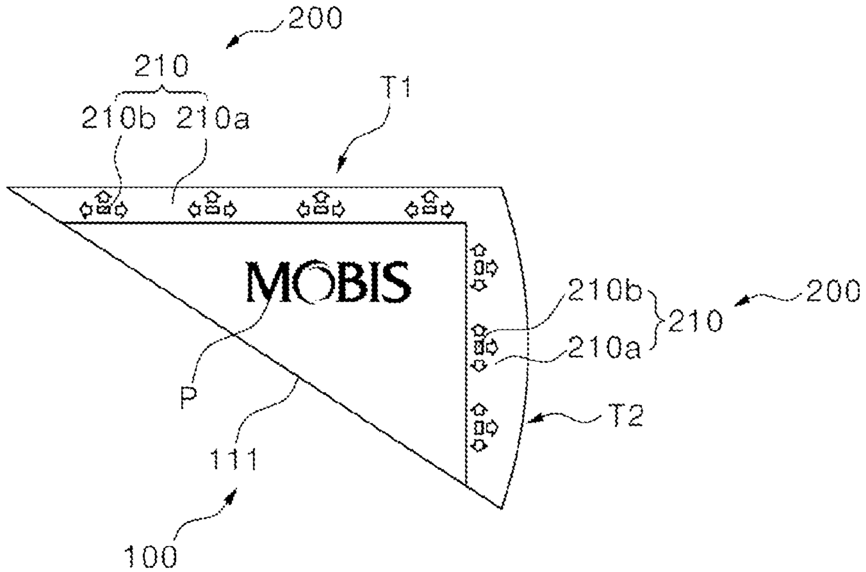
Figure 5C:
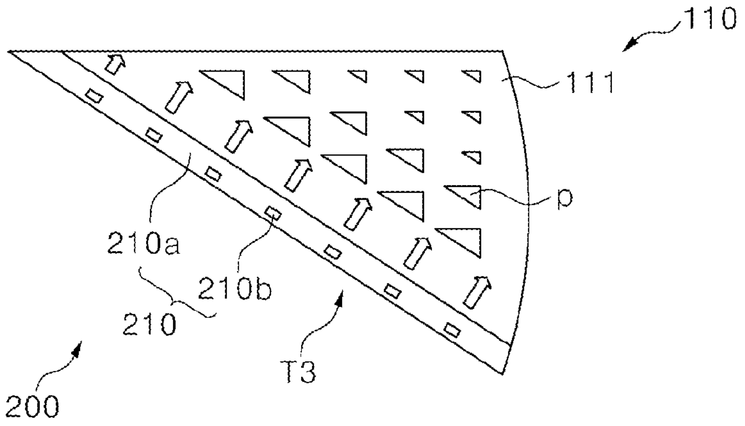
Figure 6:
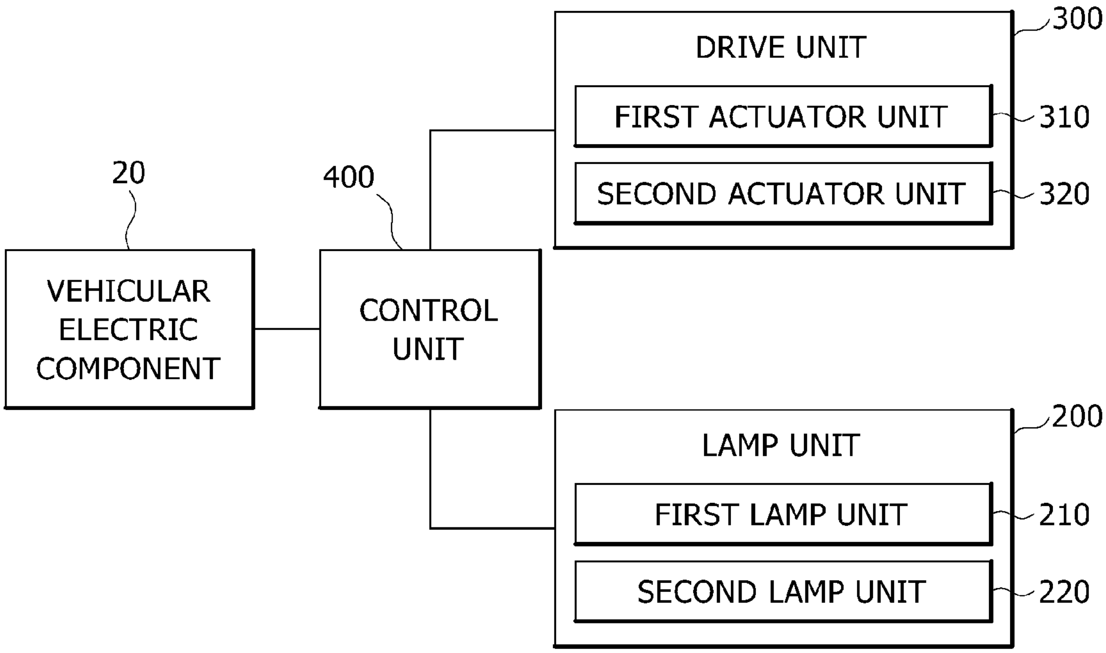
FIG. 6 is a block diagram illustrating a connectional relationship between a control unit of the vehicular aerodynamic performance improvement apparatus according to the embodiment of the present disclosure and each of constituent elements thereof.

FIG. 1 is a perspective view illustrating a state where an air current regulation unit 100 of the vehicular aerodynamic performance improvement apparatus according to the embodiment of the present disclosure is not exposed in a rear section 10. FIG. 2 is a perspective view illustrating a state where the air current regulation unit 100 of the vehicular aerodynamic performance improvement apparatus according to the embodiment of the present disclosure is exposed in the rear section 10. FIG. 3 is a cross-sectional view of a first rear body 11, which illustrates a state where a first air current regulation unit 110 of the vehicular aerodynamic performance improvement apparatus according to the embodiment of the present disclosure operates. FIG. 4 is a cross-sectional view of a second rear body 12, which illustrates a state where a second air current regulation unit 120 of the vehicular aerodynamic performance improvement apparatus according to the embodiment of the present disclosure operates. FIGS. 5A, 5B, and 5C are views of one side of a fin portion, which illustrates a state where a first lamp unit 210 of the vehicular aerodynamic performance improvement apparatus according to the embodiment of the present disclosure operates. FIG. 6 is a block diagram illustrating a connectional relationship between a control unit of the vehicular aerodynamic performance improvement apparatus according to the embodiment of the present disclosure and each of constituent elements thereof.

With reference to FIGS. 1 to 6, the vehicular aerodynamic performance improvement apparatus according to the embodiment of the present disclosure includes the air current regulation unit 100, a lamp unit 200, and a drive unit 300, which are described in detail as follows.

The air current regulation unit 100 may be provided in the rear section 10 of a vehicle 1 in a manner that is enabled to appear and disappear. The rear section 10 may refer to a rear roof, a rear pillar, and a rear door of the vehicle 1.

The air current regulation unit 100 may serve to regulate air current that flows along the roof of the vehicle 1 toward the opposite direction to the vehicle 1's forward traveling direction. In other words, while the vehicle 1 travels, the air current regulation unit 100 regulates air current that flows along the roof of the vehicle 1 from the vehicle 1's forward traveling direction toward the opposite direction to the vehicle 1's forward traveling direction. The roof may include one or more sunroofs.

The air current regulation unit 100 may include the first air current regulation unit 110 and the second air current regulation unit 120.

The first air current regulation unit 110 may include a pair of fin portions 111. The pair of fin portions 111 may be arranged on both sides, respectively, of the rear section 10. In other words, the fin portions 111 may be positioned on both sides, respectively, in the widthwise direction, of the vehicle 1 and may be arranged to be spaced apart from each other to face each other. The fin portion 111 may be formed in the shape of a flat plate and may be formed in the shape of a triangle.

The rear section 10 may include the first rear body 11. The first rear body 11 may have a first accommodation portion 11*a* inside. The first accommodation portion 11*a* is formed in the shape of a space inside the first rear body 11.

The fin portion 111 may be accommodated within the first accommodation portion 11*a*. The first rear body 11 facing upward from the vehicle 1 may have an opening in the outer surface. The opening communicates with the first accommodation portion 11*a*. The fin portions 111 may be accommodated in an upright position within the first accommodation portion 11*a*. The fin portions 111 may not be exposed from behind the first rear body 11. The fin portions 111 may protrude through the opening in the first rear body 11 and may be exposed from behind the first rear body 11.

The second air current regulation unit 120 may include a vane portion 121. The vane portion 121 may be positioned between the pair of fin portions 111. A plurality of vane portions 121 may be provided. The plurality of vane portions 121 may be arranged to be spaced apart from each other along the widthwise direction of the vehicle 1. The vane portions 121 may be formed in the shape of wings that have a smaller size than the fin portions 111.

The rear section 10 may include the second rear body 12. The second rear body 12 may have a second accommodation portion 12*a* inside. The second accommodation portion 12*a* is formed in the shape of a space inside the second rear body 12.

The vane portion 121 may be accommodated within the second accommodation portion 12*a*. The second rear body 12 facing upward from the vehicle 1 may have an opening in the outer surface. The opening communicates with the second accommodation portion 12*a*. The vane portions 121 may be accommodated in an upright position within the second accommodation portion 12*a*. The vane portions 121 may not be exposed from behind the second rear body 12. The vane portions 121 may protrude through the opening in the second rear body 12 and may be exposed from behind the second rear body 12.

The lamp unit 200 is provided on the air current regulation unit 100. The lamp unit 200 may include the first lamp unit 210 and the second lamp unit 220.

The first lamp unit 210 may be installed in the first air current regulation unit 110. In other words, the first lamp unit 210 may be provided on an outer surface of the fin portion 111 and may emit light. The first lamp unit 210 may include a board unit 210*a* and a light source unit 210*b*. The board unit 210*a* may include a printed circuit board (PCB), and the light source unit 210*b* may include a light emitting diode (LED). The first lamp unit 210 is turned on in conjunction with a brake lamp, a tail lamp, and the like of the vehicle 1.

As illustrated in FIG. 5A, the board units 210*a* of the first lamp units 210 may be installed on a first edge T1 and a second edge T2, respectively, of the fin portion 111, and the light source units 210*b* may be arranged on one side of the first edge T1 and one side of second edge T2, respectively. The light source units 210*b* may emit light in the shape of a line toward a point where the first edge T1 and the second edge (T2) meet. An arrow in FIG. 5A indicates a direction in which light is emitted. In this case, the fin portion 111 may further have an image pattern P on the outer surface. The image pattern P is formed on the outer surface of the fin portion 111 using a double injection or film insert technique. The image pattern P is not influenced by the light source unit 210*b*, and thus is not lighted.

As illustrated in FIG. 5B, the board units 210*a* of the first lamp units 210 may be installed on the first edge T1 and the second edge T2, respectively, of the fin portion 111, and a plurality of the light source units 210*b* may be arranged to be spaced apart from each other. Thus, the plurality of the light source units 210*b* may emit light in the shape of points toward the vicinity thereof. An arrow in FIG. 5B indicates a direction in which light is emitted. In this case, the fin portion 111 may further have an image pattern P on the outer surface. The image pattern P is formed on the outer surface of the fin portion 111 using the double injection or film insert technique. The image pattern P is not influenced by the light source unit 210*b*, and thus is not lighted.

As illustrated in FIG. 5C, the board unit 210*a* of the first lamp unit 210 may be installed on a third edge T3 of the fin portion 111 and may be arranged along the third edge T3 in such a manner that the plurality of the light source units 210*b* are spaced to be apart from each other. Thus, the plurality of the light source units 210*b* may emit light toward the outer surface of the fin portion 111. An arrow in FIG. 5C indicates a direction in which light is emitted. In this case, the fin portion 111 may further include an image pattern P on the outer surface. The image pattern P is formed on the outer surface of the fin portion 111 using the double injection or film insertion technique. The image pattern P is not influenced by the light source unit 210*b*, and thus is not lighted.

The second lamp unit 220 is provided on an end portion of the vane portion 121 and may emit light toward the opposite direction to the vehicle 1's forward traveling direction. The second lamp unit 220 may include a board unit (not illustrated) and a light source unit (not illustrated). The board unit may include a printed circuit board (PCB), and the light source unit may include a light emitting diode (LED).

The drive unit 300 generates drive force to operate the air current regulation unit 100. The drive unit 300 may include a first actuator unit 310 and a second actuator unit 320.

The first actuator unit 310 may provide drive force to the first air current regulation unit 110 to operate the first air current regulation unit 110. The first actuator unit 310 may be installed within the first rear body 11.

The first actuator unit 310 may be connected to the fin portion 111 and may rotate the fin portion 111 in such a manner that the fin portion 111, accommodated in the first accommodation portion 11*a*, protrudes upward from the first rear body 11. In other words, the first actuator unit 310 may include a motor unit (not illustrated) and a shaft portion (not illustrated), shaft-coupled to the motor unit for axial rotation thereof.

The fin portions 111 may be coupled to outer circumferential surfaces, respectively, of both end portions of the shaft portion. The fin portions 111 on the shaft portion may rotate forward and backward along the axial rotation direction of the shaft portion. When the shaft portion rotates in one direction by the drive force provided by the motor unit, the fin portion 111, accommodated in the first accommodation portion 11*a*, may protrude upward from the first rear body 11 through the opening in the first rear body 11.

When the shaft portion rotates in the opposite direction by the drive force provided by the motor unit, the fin portion 111 protruding upward from the first rear body 11 may be accommodated within the first accommodation portion 11*a* through the opening in the first rear body 11.

The second actuator unit 320 may provide drive force to the second air current regulation unit 120 to operate the second air current regulation unit 120. The second actuator unit 320 may be installed within the second rear body 12.

The second actuator unit 320 is connected to the vane portion 121 and may rotate the vane portion 121 in such a manner that the vane portion 121 accommodated within the second accommodation portion 12*a* protrudes upward from the second rear body 12. In other words, the second actuator unit 320 may include a motor unit (not illustrated) and a shaft portion (not illustrated), shaft-coupled to the motor unit for axial rotation thereof.

The vane portion 121 may be coupled to an outer circumferential surface of the shaft portion along the lengthwise direction of the shaft portion. The vane portion 121 on the shaft portion may rotate forward and backward along the axial rotation direction of the shaft portion. When the shaft portion rotates in one direction by the drive force provided by the motor unit, the vane portion 121 accommodated in the second accommodation portion 12*a* may protrude upward the second rear body 12 through the opening in the second rear body 12.

When the shaft portion rotates in the opposite direction by the drive force provided by the motor unit, the vane portion 121 protruding upward from the second rear body 12 may be accommodated within the second accommodation portion 12*a* through the opening in the second rear body 12.

The vehicular aerodynamic performance improvement apparatus according to the embodiment of the present disclosure may further include a control unit 400.

The control unit 400 may be electrically connected to the drive unit 300. The control unit 400 may be connected to a vehicular electric component 20. The control unit 400 may receive an operative signal from the vehicular electric component 20, thereby controlling the operation of the drive unit 300. In the embodiment of the present disclosure, the control unit 400 may control the drive unit 300 according to a traveling speed of the vehicle 1 in such a manner that the air current regulation unit 100 is exposed or is not exposed from behind the rear section 10. Examples of the vehicular electric component 20 here may include a vehicular speed sensor.

When the traveling speed of the vehicle 1 reaches or exceeds a preset speed, the control unit 400 may operate the first actuator unit 310 by receiving a signal generated in the vehicular speed sensor of the vehicle 1 in such a manner that the fin portion 111 accommodated within the first rear body 11 is exposed from behind the first rear body 11.

With the first air current regulation unit 110 protruding upward from the rear section 10 of the vehicle 1, air current, flowing along the roof of the vehicle 1 from the vehicle 1's forward traveling direction toward the opposite direction to the vehicle 1's forward traveling direction while the vehicle 1 travels, may be guided in such a manner as not to be distributed to the roof side of the vehicle 1. Thus, the air current, flowing along the roof side, can be redirected more backward toward the opposite direction to the vehicle 1's forward traveling direction, thereby reducing drag force, formed behind the vehicle 1.

In addition, when the traveling speed of the vehicle 1 reaches or exceeds the preset speed, the control unit 400 may operate the second actuator unit 320 by receiving a signal generated in the vehicular speed sensor of the vehicle 1 in such a manner that vane portion 121 accommodated within the second rear body 12 is exposed from behind the second rear body 12. At this point, the control unit 400 may simultaneously control the operation of the first actuator unit 310 and the operation of the second actuator unit 320. Additionally, the control unit 400 may individually control the operation of the first actuator unit 310 and the operation of the second actuator unit 320.

With the second air current regulation unit 120 protruding upward from the rear section 10 of the vehicle 1, a vortex phenomenon can be reduced that occurs due to air current that flows along the roof of the vehicle 1 from the vehicle 1's forward traveling direction toward the opposite direction to the vehicle 1's forward traveling direction while the vehicle 1 travels. Thus, fuel efficiency (energy efficiency) can be improved by reducing air drag acting on the surface of the vehicle 1.

As another implementation example of the present disclosure, the control unit 400 may control the drive unit 300 in such a manner that the air current regulation unit 100 is exposed or not exposed according to the traveling mode of the vehicle 1 in the rear section 10.

With a control signal, generated in an ECU of the vehicle 1 according to the traveling mode of the vehicle 1 that is selected by an occupant's manual operation, the control unit 400 may operate the first actuator unit 310 in such a manner that the fin portion 111 accommodated within the first rear body 11 is exposed from behind the first rear body 11.

In addition, with a control signal, generated in the ECU of the vehicle 1 according to the traveling mode of the vehicle 1 that is selected by the occupant's manual operation, the control unit 400 may operate the second actuator unit 320 in such a manner that the vane portion 121 accommodated within the second rear body 12 is exposed from behind the second rear body 12. At this point, the control unit 400 may simultaneously control the operation of the first actuator unit 310 and the operation of the second actuator unit 320. Additionally, the control unit 400 may individually control the operation of the first actuator unit 310 and the operation of the second actuator unit 320.

The control unit 400 may be electrically connected to the lamp unit 200. The control unit 400 may be electrically connected to the vehicular electric component 20. The control unit 400 may receive the operative signal from the vehicular electric component 20, thereby controlling the operation of the lamp unit 200. In other words, with a control signal, generated in the ECU of the vehicle 1 according to the traveling mode of the vehicle 1 that is selected by the occupant's manual operation, the control unit 400 may control the first lamp unit 210 in such a manner that an optical pattern of the first lamp unit 210 varies in various ways.

In the vehicular aerodynamic performance improvement apparatus according to the embodiment of the present disclosure, the first air current regulation unit 110, provided in a manner that is enabled to appear and disappear in the rear section 10 of the vehicle 1, can guide air current that flows along the roof from the vehicle 1's forward traveling direction toward the opposite direction to the vehicle 1's forward traveling direction while the vehicle 1 travels, in such a manner as not to be distributed to the roof side of the vehicle 1. Thus, the air current, flowing along the roof side, can be redirected more backward toward the opposite direction to the vehicle 1's forward traveling direction, thereby reducing the drag force, formed behind the vehicle 1.

In the vehicular aerodynamic performance improvement apparatus according to the embodiment of the present disclosure, the second air current regulation unit 120, provided in a manner that is enabled to appear and disappear in the rear section 10 of the vehicle 1, can reduce the vortex phenomenon that occurs due to air current that flows along the roof of the vehicle 1 from the vehicle 1's forward traveling direction toward the opposite direction to the vehicle 1's forward traveling direction while the vehicle 1 travels. Thus, the fuel efficiency (energy efficiency) can be improved by reducing the air drag pulling on the surface of the vehicle 1.

The embodiment of the present disclosure is described only in an exemplary manner with reference to the drawings. It would be apparent to a person of ordinary skill in the art to which the present disclosure pertains that various modifications could be made to the embodiment and that various equivalents thereof could be implemented. Therefore, the proper technical scope of the present disclosure should be defined by the following claims.

What is claimed is:

1. A vehicular aerodynamic performance improvement apparatus comprising:

an air current regulator comprising a plurality of extensions configured to: extend out of and retract into a rear section of a vehicle, and regulate air current that flows between the extensions and along a roof of the vehicle in an opposite direction, which is a direction opposite to a forward traveling direction of the vehicle;

a lamp provided on the air current regulator; and a driver configured to generate a drive force to operate the air current regulator to move the extensions.

2. The vehicular aerodynamic performance improvement apparatus of claim 1, wherein the air current regulator comprises:

a first air current regulator including a pair of fin portions arranged on both sides, respectively, of the rear section; and a second air current regulator including a plurality of vane portions positioned between the pair of fin portions, the plurality of bane portions arranged to be spaced apart from each other along a widthwise direction of the vehicle.

3. The vehicular aerodynamic performance improvement apparatus of claim 2, wherein the rear section comprises:

a first rear body having a first accommodation portion in which the pair of fin portions are accommodated; and a second rear body a having a second accommodation portion in which the plurality of vane portions are accommodated.

4. The vehicular aerodynamic performance improvement apparatus of claim 3, wherein the driver comprises:

a first actuator connected to the pair of fin portions and configured to rotate the pair of fin portions such that the pair of fin portions accommodated in the first accommodation portion protrudes upward from the first rear body; and a second actuator connected to the plurality of vane portions and configured to rotate the plurality of vane portions such that the plurality of vane portions accommodated in the second accommodation portion protrudes upward from the second rear body.

5. The vehicular aerodynamic performance improvement apparatus of claim 2, wherein the lamp comprises:

a first lamp provided on an outer surface of the fin portion and configured to emit light; and a second lamp provided on an end portion of the vane portion and configured to emit light toward the opposite direction to the forward traveling direction of the vehicle.

6. The vehicular aerodynamic performance improvement apparatus of claim 1, further comprising:

a controller electrically connected to the driver and electrically connected to the lamp, wherein the controller is configured to receive an operative signal from a vehicular electric component and control an operation of the driver and an operation of the lamp.

7. The vehicular aerodynamic performance improvement apparatus of claim 6, wherein the controller is further configured to control the driver according to a traveling speed of the vehicle such that the air current regulator is exposed or not exposed in the rear section.

8. The vehicular aerodynamic performance improvement apparatus of claim 6, wherein the controller is further configured to control the driver according to a traveling mode of the vehicle such that the air current regulator is exposed or not exposed in the rear section.

9. An aerodynamic performance improvement apparatus for a vehicle, the apparatus comprising:

an air current regulator positioned in at least one of a roof of the vehicle, a section of the vehicle between the roof of the vehicle and a rear of the vehicle, or a combination thereof, the air current regulator including a plurality of extensions;

a driver configured to actuate the air current regulator; and a processor configured to: control the driver to generate a driving force to operate the air current regulator to fully or partially extend the extensions out of the air current regulator and retract the extensions into the air current regulator, based on a traveling speed of the vehicle, wherein the movement of the extensions out of the air current regulator regulates air current that flows between the extensions and along a roof of the vehicle toward an opposite direction from a forward traveling direction of the vehicle.

10. The apparatus of claim 9, wherein the air current regulator further comprises at least one of a first air current regulator at the roof of the vehicle, and a second air current regulation regulator at the section of the vehicle between the roof of the vehicle and the rear of the vehicle.

11. The apparatus of claim 10, wherein the extensions in the first air current regulator includes a pair of fin portions, and wherein the extensions in the second air current regulator includes a plurality of wing-shaped vane portions.

12. The apparatus of claim 11, wherein the wing-shaped vane portions are positioned between the pair of fin portions, and wherein the wing-shaped vane portions are smaller in size than the fin portions.

* * * * *